United States Patent Office 3,533,711
Patented Oct. 13, 1970

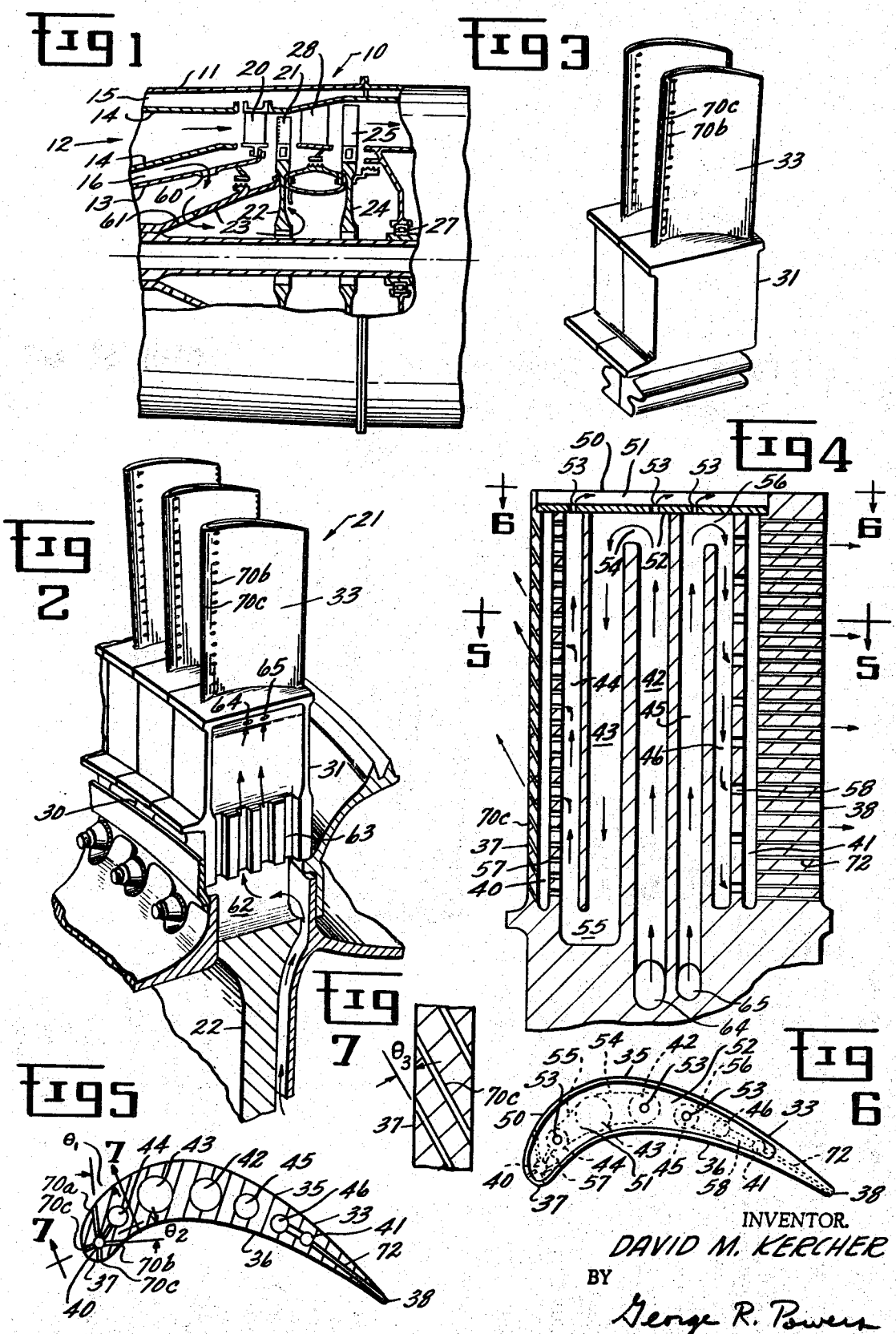

1

3,533,711
COOLED VANE STRUCTURE FOR HIGH
TEMPERATURE TURBINES
David M. Kercher, Cincinnati, Ohio, assignor to General
Electric Company, a corporation of New York
Filed Feb. 26, 1966, Ser. No. 533,120
Int. Cl. F01d 5/08
U.S. Cl. 416—90                              10 Claims This invention relates to cooled blading for high temperature turbomachines and, more particularly, to a turbine vane construction having improved means for controlling and directing the flow of a cooling fluid through the interior and over the exterior surfaces of the vane.

It is well known that the efficiency of a gas turbine engine is related to the operating temperature of the turbine and that the efficiency may be increased, in theory, by increasing the operating temperature. As a practical matter, however, the maximum turbine operating temperature is limited by the high temperature capabilities of the various turbine elements. Since the engine efficiency is thus limited by temperature considerations, turbine designers have expended considerable effort toward increasing the high temperature capabilities of turbine elements, particularly the airfoil shaped vanes upon which high temperature combustion products impinge. Some increase in engine efficiency has been obtained by the development and use of new materials capable of withstanding higher temperatures. These new materials are not, however, generally capable of withstanding the extremely high temperatures desired in modern gas turbines. Consequently, various cooling arrangements for vanes have been devised for extending the upper operating temperature limit by keeping the vane material at the lower temperatures which it is capable of withstanding without pitting or burning out. As used herein, the term "vane" is a generic term referring to airfoil-shaped elements used in high temperature turbomachines. As such, the term applies not only to those members popularly known as vanes, but also to other airfoil-shaped members commonly known as blades, buckets, etc. In fact, the present invention is illustrated herein in conjunction with the airfoil-shaped vanes of a turbine rotor; such vanes are often called buckets.

Cooling of vanes is generally accomplished by providing internal flow passages within the vanes to accommodate the flow of a cooling fluid, the fluid typically being compressed air bled from either the compressor or the combustor. It is also well known that the engine efficiency theoretically possible is reduced by the extraction of cooling air. It is therefore imperative that cooling air be utilized effectively, lest the decrease in efficiency caused by the extraction of the air be greater than the increase resulting from the higher turbine operating temperature. In other words, the cooling system must be efficient from the standpoint of minimizing the quantity of cooling air required. It is also essential that all portions of the turbine vanes be cooled adequately. In particular, adequate cooling must be provided not only for the leading and trailing edge regions of the vanes, the portions most adversely affected by the high temperature combustion gases, but also for the midchord region between the leading and trailing edges.

It has been found that cooling configurations available in the past have tended to have deficiencies with respect to the foregoing requirements. Cooling systems which use minimum quantities of cooling air commonly fail to cool adequately all portions of the vane. As a result, a critical portion such as the leading edge may crack, burn out, or pit after a relatively short operating period. On the other hand, those systems which adequately cool all portions of the vane commonly require too much air for efficient

2 overall engine performance, the reason being that the cooling air is not used efficiently. For example, an inefficient arrangement may direct the cooling air through the interior of the vane in a manner which results in the creation of low convection heat transfer coefficients, or rates of heat transfer. Other characteristics, such as inadequate heat transfer area, can also prevent effective use of the cooling air.

It is therefore an object of this invention to provide for high temperature turbomachines an improved vane structure by which cooling fluid is utilized in a highly efficient manner.

It is another object of this invention to provide for high temperature turbomachines an improved vane structure by which all portions of the vane are cooled adequately.

A further object of this invention is to provide for high temperature turbines an improved vane arrangement which is relatively simple and inexpensive to manufacture and lightweight, sturdy, and reliable in operation.

Briefly stated, in carrying out the invention in one form, a vane for use in a high temperature turbomachine has a plurality of axially spaced passages formed therein, the passages including a radial passage adjacent the leading edge of the vane, a radial passage adjacent the trailing edge of the vane, a first serpentine passage adjacent the leading edge passage, and a second serpentine passage adjacent the trailing edge passage. The leading edge passage and the first serpentine passage are interconnected by a plurality of radially spaced openings, and the trailing edge passage and the second serpentine passage are similarly interconnected by a plurality of radially spaced openings. The vane also has inlet means for supplying cooling fluid, such as air, to the serpentine passages. From the leading and trailing edges passages, the cooling fluid is discharged through outlet means comprising multiplicities of passages in the leading edge and trailing edge regions, respectively, of the vane. In the leading edge region, the passages are disposed along axes forming acute angles with the exterior vane surfaces such that the cooling fluid forms a thin layer of cooling fluid on the exterior wall surfaces to provide film cooling. More particularly, these passages are disposed such that cooling fluid ejected along the convex and concave side walls is directed along the walls toward the trailing edge of the vane and such that cooling fluid ejected at the leading edge is directed radially along the leading edge. Moreover, the angular disposition of the passages provides extended convection heat transfer area in the leading edge region. By a further aspect of the invention, cooling at the critical leading edge region is enhanced by impingement cooling. Specifically, the radially spaced passages interconnecting the leading edge passage and the first serpentine passage are sized to throttle cooling fluid flowing therethrough and to direct the accelerated fluid against the interior wall surfaces in the leading edge region of the vane. The turbulence thus introduced into the cooling fluid results in high rates, or coefficients, of convection heat transfer at the leading edge.

By still further aspects of the invention, efficient and adequate cooling is provided also at the critical trailing edge region and at the midchord region of the vane. The midchord region is cooled by convection heat transfer to the cooling fluid flowing through both the first and the second serpentine passages, which preferably have cross sectional areas which decrease between the inlet means and the outlet means such that convection heat transfer coefficients generated by the cooling fluid increase between the inlet and outlet means. By arranging the passages of the serpentine passages such that the maximum cross sectional flow areas are substantially midway between the leading and trailing edges, where the vane is thickest, and the minimum cross sectional areas are closer to the leading and trailing edges, two important advantages may be attained, these being that chordwise temperature gradients and vane weight are reduced significantly. After cooling the midchord region, the cooling fluid in the second serpentine passage flows to the trailing edge passage, from which it is discharged through the multiplicity of radially spaced passages axially interconnecting the trailing edge passage and substantially the entire trailing edge. The multiplicity of passages, which provide a concentration of convection surfaces, assure adequate cooling in the trailing edge region. When used in rotor assemblies, the vane may be provided with bleed openings for ejection of foreign matter so that the serpentine passages will not become fouled with foreign matter.

The invention as just described is an improvement on the invention described and claimed in a co-pending application Ser. No. 533,118, entitled "Cooled Vane Structure for High Temperature Turbine," filed on Feb. 26, 1966, in the name of Armando J. Quinones and assigned to the assignee of this invention.

While the novel features of this invention are set forth with particularity in the appended claims, the invention, both as to organization and content, will be better understood and appreciated, along with other objects and features thereof, from the following detailed description taken in conjunction with the drawings, in which:

FIG. 1 is a sectional view of a portion of a gas turbine engine having a turbine rotor assembly incorporating the present invention;

FIG. 2 is a pictorial view of a portion of the rotor assembly of FIG. 1;

FIG. 3 is a pictorial view, in enlarged scale, of one of the vanes, or buckets, of the rotor assembly;

FIG. 4 is a view, in enlarged scale, showing the vane in longitudinal section;

FIG. 5 is a view taken along viewing line 5—5 of FIG. 4 showing the vane in transverse section;

FIG. 6 is a view taken along viewing line 6—6 of FIG. 4 showing the outer end of the vane; and FIG. 7 is a view taken along viewing line 7—7 of FIG. 5.

Referring to the drawings, and particularly to FIG. 1, the high temperature portions of an axial flow gas turbine engine 10 are illustrated, the engine having an outer cylindrical casing 11 circumferentially surrounding the high temperature portions. The illustrated gas turbine structure includes an annular combustion space indicated generally by 12, the combustion space 12 being formed between the cylindrical casing 11 and an inner wall 13. An annular combustion liner 14 is located within the space 12 in spaced relation to the casing 11 and the wall 13, the actual combustion occurring within the annular combustion liner 14. The annular spaces 15 and 16 between the combustion liner 14 and the casing 11 and the wall 13, respectively, are filled with high pressure air discharged by the compressor (not shown). This high pressure air, which is quite cool relative to the high temperature combustion gases within the combustion liner 14, is admitted in a controlled manner to the interior of the combustion liner to support combustion and provide cooling therein. In accordance with the present invention, this relatively cool air may also be used for cooling certain turbine elements exposed to the high temperature combustion products.

An annular nozzle diaphragm indicated generally by 20 in FIG. 1 is located at the downstream end of the combustion liner 14 for supplying the hot products of combustion to a row of turbine rotor vanes, or buckets, 21 at the proper velocity and at the proper angle. The turbine buckets 21 are peripherally mounted on a turbine wheel 22 which, along with its associated shaft 23 and a second turbine wheel 24 having buckets 25 mounted thereon, is rotatably mounted on the engine axis 26 by suitable mounting means including a bearing arrangement 27. The turbine unit comprising the wheels 22 and 24 and the shaft 23 drives the compressor (not shown) of the engine 10.

With reference now directed to FIGS. 1 and 2, it will be noted that the entire flow of combustion products passes through the annular nozzle diaphragms 20 and 28 and over the rows of turbine buckets 21 and 25. If the gas turbine engine 10 is to operate at the efficiency and power levels desired in modern gas turbine engines, the combustion products must be discharged from the combustion lnier 14 at temperatures higher than those which can be withstood without cooling by vanes made of currently available materials. The present invention makes this desired efficiency possible by providing adequate cooling in a highly efficient manner for all vane portions. In the illustrated embodiment, the cooling arrangement of the invention is applied only to the turbine buckets 21, but it will become clear as this description proceeds that the invention could be utilized in conjunction with blading other than turbine buckets, such as the airfoil shaped vanes comprising the turbine nozzle diaphragms 20 and 28.

Before turning attention to the precise manner by which the present invention controls and directs the flow of cooling fluid through the interior and over the exterior surfaces of the turbine buckets 21, it will be well to describe briefly the general arrangement and construction of the turbine rotor assembly. Specifically, the rotor wheel 22 has a plurality of circumferentially spaced slots 30 in its outer periphery, the turbine buckets 21 having base portions 31 received in the slots 30. A vane body 33 is integrally formed with each base portion 31 and extends radially outwardly therefrom, the vane body 33 being the portion of the turbine bucket 21 actually subjected to the high temperature combustion products.

The vane body 33 of each turbine bucket is an airfoil shaped member having an exterior convex side wall surface 35 and an exterior concave side wall surface 36 interconnecting axially spaced leading and trailing edges 37 and 38, respectively. As best shown by FIGS. 5 and 6, the aerodynamic shape of the vane body 33 at the leading edge 37 is rounded and rather blunt while the trailing edge region is tapered and quite thin. To cool these critical leading and trailing edge regions, as well as the midchord region, in accordance with the present invention, each vane body 33 is formed with heat exchange passages therein as illustrated by FIGS. 4–7. More particularly, the vane body 33 has a plurality of axially spaced passages formed therein, the passages including a radial passage 40 adjacent the leading edge 37, a radial passage 41 adjacent the trailing edge 38, a first serpentine passage comprising axially spaced, radial passages 42, 43, and 44, and a second serpentine passage comprising axially spaced, radial passages 45 and 46. As best shown by FIGS. 4–6, the passages 40–46 are radial holes extending inwardly from the radially outer end 50 of the vane body 33 to the base portions 31, the outer end 50 of the vane body 33 having a recess or plenum 51 formed therein. An end wall plate 52 is located in the recess 51 to close, except for bleed openings 53, the outer ends of the passages 40–46. As illustrated by FIG. 4, the radial passages 42 and 43 are axially interconnected by an opening 54 at their radially outer ends adjacent the end wall 52 and the passages 43 and 44 are axially interconnected by an opening 55 at their inner ends adjacent the base portion 31, the passages 42–44 thus forming the first serpentine passage. Similarly, the passages 45 and 46 are axially interconnected by an opening 56 at their radially outer ends adjacent the end wall 52 to form the second serpentine passage.

Within the vane body 33, a plurality of relatively small throttling openings 57 interconnect the leading edge passage 40 and the radial passage 44, the openings 57 being radially spaced along substantially the entire radial extent of the vane body 33. These openings 57 are sized to throttle flow of cooling fluid so as to thereby enhance convection cooling at the leading edge region in accordance with the present invention. Another plurality of radially spaced openings 58 interconnect the trailing edge passage 41 and the radial passage 46. In the illustrated embodiment, these cross-over openings 58 are sized to provide fluid communication without throttling between the passages 41 and 46. If enhanced convection heat transfer is desired in the trailing edge region, it will be obvious from the subsequent description to those skilled in the art that the openings 58, as the openings 47, could be sized to throttle the flow of cooling fluid therethrough.

The cooling fluid for cooling the turbine buckets 21 is relatively cool compressed air bled from the combustion space 16 through circumferentially spaced openings 60 in the inner wall 13 as illustrated by the arrows of FIG. 1. From the openings 60, the air flows through circumferentially spaced openings 61 in the rotor shaft 23, from which it flows axially downstream to the aft side of the rotor wheel 22 where it flows outwardly along the aft side of the rotor wheel 22 to provide wheel cooling. The cool air then enters a plenum region 62 radially inward of the base portion 31, from which it flows radially outward through grooves 63 communicating with inlet openinggs 64 and 65 to the radial passages 42 and 45, respectively. In this manner, cooling air is admitted to the interior of the vane body 33.

In accordance with the present invention, outlet means are also provided for discharging cooling fluid from the vane body 33. The outlet means includes a multiplicity of passages 70 in the leading edge region of the vane body 33, the illustrated vane having a row of radially spaced passages 70a interconnecting the leading edge passage 40 and the convex side wall surface 35, a row of radially spaced passages 70b interconnecting the leading edge passage 40 and the concave side wall surface 36, and two rows of radially spaced passages 70c interconnecting the leading edge passage 40 and the leading edge 37. These passages 70 have very small cross sectional areas, the diameters of the passages being in the order of 0.005 inch to 0.025 inch, and are disposed along axes forming acute angles with the exterior wall surfaces. In the illustrated embodiment, the axes of the passages 70a form an arcuate angle $\theta_1$ of preferably less than 30° with the convex side wall surface 35 and the axes of the passages 70b form a similar acute angle $\theta_2$ of preferably less than 30° with the concave side wall surface 36. In addition, the passages 70a and 70b are disposed such that cooling fluid discharged from the leading edge passage 40 through the passages flows axially downstream along the wall surfaces toward the trailing edge 38. Similarly, as best shown by FIG. 7, the axes of the passages 70c form an acute angle $\theta_3$ of approximately 30° with the leading edge 37, the passages being disposed such that cooling fluid discharged from the passages 70c flows radially outward along the leading edge 37. The function of the passages 70 and the reasons for their particular orientation will become apparent as this description proceeds.

The outlet means from the vane body 33 also includes a multiplicity of passages 72 in the tapered and thin trailing edge region. The radially spaced passages 72 extend axially between the radial passage 41 and substantially the entire trailing edge and are, as the passages 70 in the leading edge region, of very small cross sectional area.

In operation, relatively cool high pressure air from the combustion space 16 is admitted through the inlet openings 64 and 65 in the base portion 31 to the radial passages 42 and 45 of the first and second serpentine passages, respectively. The cooling fluid in the first serpentine passage flows radially outward through passage 42, then radially inward through passage 43, and then radially outward through the passage 44 from which it is accelerated through the openings 57 to the leading edge passage 40. Similarly, the cooling fluid in the second serpentine passage flows radially outward through the passage 45 and then radially inward through the passage 46 from which it flows through the cross-over openings 58 to the trailing edge passage 41. From the leading edge passage 40 and the trailing edge passage 41, the cooling air is discharged through the openings 70 and 72 to the exterior of the vane.

The structural arrangement just described provides an adequate and extremely efficient cooling system. For example, at thet leading edge region where cooling problems have heretofore been most acute, the present invention provides both convection and film cooling with the same cooling fluid. In addition, the convection cooling at the leading edge is greatly enhanced by impingement cooling and extended heat transfer area. By way of explanation, it is pointed out that the openings 57 interconnecting the first serpentine passage and the leading edge passage 40 are throttling holes; since the openings 57 are sized to throttle the flow of cooling fluid, the fluid is accelerated as it flows between the radial passages 44 and 40. As a result, the accelerated fluid strikes the inner vane surfaces in the leading edge region as a plurality of high velocity jets and thereby causes extreme turbulence and high heat transfer coefficients at the leading edge. This so-called impingement cooling thus causes high convection heat transfer rates at the leading edge 37. From the leading edge passage 40, the cooling air is discharged through the openings 70 which, because of their angular orientation, provide much greater convection heat transfer area than would be present if the passages were normal to the wall surfaces. This extremely effective convection cooling is supplemented by film or boundary layer cooling since the angular orientation of the passages 70 causes the discharged cooling fluid to be trapped in the boundary layer and thereby form in thin layers on the exterior vane surfaces in the leading edge region, thus relatively insulating the vane body 33 from the hot combustion products.

The cooling arrangement of the present invention provides extremely effective cooling in the midchord region where the boundary layer of cooling air discharged from the passages 70 begins to separate from the convex and concave side wall surfaces 35 and 36. More particularly, the midchord region is convection cooled by the cooling fluid flowing the entire length of the vane through the passages 42-46, all of the fluid traversing the entire length of the vane body 33 more than once and some of the fluid taversing the entire length as much as three times. In addition, it will be noted that the passage 42 is of greater cross sectional area than the passage 43, which in turn is of greater cross sectional area than the passage 44. Similarly, passage 45 is of greater cross sectional area than passage 46. In other words, the cross sectional flow areas of the first and second serpentine passages decrease between their inlet and outlet means. Because of this decrease in flow area, the cooling air is accelerated and higher heat transfer coefficients are generated by the cooling air as it flows through the serpentine passages. At the same time, however, the cooling fluid is warmed as it flows through the serpentine passages. The increase in rate of theat transfer caused by the higher heat transfer coefficients and the decrease in the rate of heat transfer caused by warming of the fluid tend to cancel one another, the net result being substantially uniform heat transfer throughout the midchord region and minimum temperature gradients in the vane body 33. In addition, the provision of maximum diameter passages in the thickest region of the vane body 33 provides a relatively lightweight and uniformly strong vane configuration. Furthermore, this particular arrangement for cooling the midchord region is quite satisfactory from an efficient viewpoint since the same cooling fluid is used subsequently for cooling the leading and trailing edge regions.

In the critical trailing edge region, convection cooling is provided by cooling fluid flowing through the small diameter passages 72 extending axially between trailing edge passage 41 and the entire radial extent of the trailing edge 38. As in the case of the passages 70 in the leading edge region, the passages 72 provide a concentration of heat exchange area for extremely effective convection heat transfer.

To assure efficient utilization of cooling fluid, it is essential that the throttling holes 57 and the passages 70 in the leading edge region and the passages 72 in the trailing edge region permit sufficient, but not excessive, flow through the various portions of the vane body 33. This can be accomplished by controlling the number and individual flow areas of the holes and passages and, of course, the pressure differential between the interior regions of the vane body and the static hot gas pressure on the exterior vane surfaces.

The cooling arrangement of the present invention also provides adequate convection cooling of the outer end wall 52 by the cooling fluid flowing through the opening 54 between the radial passages 42 and 43 and the opening 56 between the radial passages 45 and 46. As indicated previously, bleed openings 53 are provided in the end wall 52, the openings 53 communicating with the openings 54 and 56 of the serpentine passages. The purpose of these bleed openings 53 is to permit small particles of foreign matter to escape from the serpentine passages. If the bleed openings 53 were not provided, centrifugal force would cause such particles to pile up in the openings 54 and 56 and at the outer end of the passage 44, the eventual result being blockage of the serpentine passages and failure of the cooling system. These bleed openings 53 are sized such that only a very small portion of the total cooling air flow escapes through the end wall 52 with the foreign matter. The small percentage of air which does pass through the openings is discharged into the recess 51 at the outer end 50 of the vane, from which it then reenters the main stream of hot combustion gases.

As pointed out above, the cooling arrangement of this invention is not limited to use in turbine buckets; it may of course be applied with equal utility to nozzle diaphragms for gas turbine engines and to vanes utilized in other high temperature turbomachines, such as high pressure compressors. It will also be obvious to those skilled in the art that the general arrangement of this invention may be used if desired for related purposes such as for anti-icing compressor vanes. It will also be obvious that the invention may be used in vanes formed differently than that of the illustrated turbine buckets 21 having drilled passages.

It will thus be seen that a vane structure constructed in accordance with this invention utilizes substantially the minimum amount of cooling fluid consistent with adequate cooling of all vane portions. In addition, the resultant vane is relatively simple and is lightweight, sturdy, and reliable in operation.

It will be understood that the invention is not limited to the specific details of the construction and arrangement of the particular embodiments illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. In an axial flow turbomachine, a vane comprising:
   a radially extending vane body having exterior wall surfaces including convex and concave side wall surfaces interconnecting axially spaced leading and trailing edges,
   interior wall surfaces forming a radially extending passage adjacent the leading edge, a radially extending passage adjacent the trailing edge, a first serpentine passage adjacent said leading edge passage, and a second serpentine passage adjacent said trailing edge passage,
   means forming a plurality of radially spaced passages interconnecting said first serpentine passage and said leading edge passage,
   means forming a plurality of radially spaced passages interconnecting said second serpentine passage and said trailing edge passage,
   inlet means for admitting heat transfer fluid to said first and second serpentine passages,
   leading edge outlet means comprising a multiplicity of passages interconnecting said leading edge passage and the exterior wall surfaces,
   and trailing edge outlet means comprising a multiplicity of passages interconnecting said trailing edge passage and the trailing edge of said vane body.

2. A vane as defined by claim 1 which said multiplicity of passages in the leading edge region of said vane body form at least one row of radially spaced openings in the convex side wall surface and at least one row of radially spaced openings in the concave side wall surface, the passages of said rows being disposed along axes forming acute angles with the side wall surfaces and being directed toward the trailing edge such that heat transfer fluid discharged from the passages forms relatively thin layers of heat transfer fluid on said convex and concave side wall surfaces in the leading edge region of said vane body.

3. A vane as defined by claim 2 in which said multiplicity of passages in the leading edge region of said vane body further form at least one row of radially spaced openings at the leading edge, the passages of said row being disposed along axes forming acute angles with the leading edge and being directed radially such that heat transfer fluid discharged from the passages of said row forms a relatively thin layer of heat transfer fluid flowing radially along the leading edge of said vane body.

4. A vane as defined by claim 3 in which the radially spaced passages interconnecting said first serpentine passage and said leading edge passage are sized to throttle heat transfer fluid flowing therethrough and to direct the high velocity fluid against the interior wall surfaces of said leading edge passage, whereby high convection heat transfer coefficients are generated at the leading edge of said vane body.

5. In a high temperature axial flow turbine, a rotor assembly comprising:
   a rotor wheel,
   a plurality of circumferentially spaced, radially extending vanes peripherally mounted on said rotor wheel,
   each of said vanes including a base portion engaging said rotor wheel and a vane body extending radially outward from said base portion,
   said vane body having an outer end wall and exterior wall surfaces including convex and concave side wall surfaces interconnecting axially spaced leading and trailing edges,
   interior wall surfaces forming a passage adjacent the leading edge extending radially between said base portion and said outer end wall, a passage adjacent the trailing edge extending radially between said base portion and said outer end wall, a first serpentine passage adjacent said leading edge passage, and a second serpentine passage adjacent said trailing edge passage,
   each of said first and second serpentine passages comprising at least two interconnected, axially spaced passages each extending radially between said base portion and said outer end wall,
   means forming a plurality of radially spaced passages interconnecting said first serpentine passage and said leading edge passage,
   means forming a plurality of radially spaced passages interconnecting said second serpentine passage and said trailing edge passage,
   inlet means for admitting cooling fluid through said base portion to said first and second serpentine passages, leading edge outlet means comprising a multiplicity of passages interconnecting said leading edge passage and the exterior wall surfaces, said passages being disposed along axes forming acute angles with the exterior wall surfaces such that cooling fluid discharged through said passages forms a relatively thin layer of cooling fluid on the exterior wall surfaces in the leading edge region of said vane body, and trailing edge outlet means comprising a multiplicity of radially spaced passages interconnecting said trailing edge passage and substantially the entire trailing edge of said vane body.

6. A rotor assembly as defined by claim 5 in which the multiplicity of passages in the leading edge region of said vane body form a first row of radially spaced openings in the concave side wall surface, a second row of radially spaced openings in the concave side wall surface, and third and fourth parallel rows of radially spaced openings as the leading edge, the axes of the passages of said first and second rows being disposed so as to direct cooling fluid discharged from the passages toward the trailing edge and the axes of the passages of said third and fourth rows being disposed so as to direct cooling fluid discharged from the passages radially outward along the leading edge of the vane body.

7. A rotor assembly as defined by claim 6 in which the radially spaced passages interconnecting said first serpentine passage and said leading edge passage are sized to throttle cooling fluid flowing therethrough and to direct the high velocity fluid against the interior wall surfaces of said leading edge passage, whereby high convection heat transfer coefficients are generated at the leading edge of said vane body.

8. A rotor assembly as defined by claim 7 in which at least two of the radial passages comprising each of said first and second serpentine passages are axially interconnected at the radially outer end of said vane body adjacent said outer end wall, said outer end wall having bleed openings therein communicating with said serpentine passages to permit the ejection of foreign matter therethrough.

9. A rotory assembly as defined in claim 8 in which the cross sectional areas of the radial passages directly communicating with said inlet means are greater than the cross sectional areas of the radial passages directly communicating with said leading and trailing edge passages such that the heat transfer coefficients generated by cooling fluid through said serpentine passages increase between said inlet means and said leading and trailing edge passages.

10. A rotor assembly as defined by claim 9, in which the radial passages comprising said first and second serpentine passages are disposed with the passages of maximum cross sectional area located adjacent each other substantially midway between said leading and trailing edges where the distance between said convex and concave side wall surfaces is greatest and the passages of minimum cross sectional area located adjacent said leading edge and said trailing edge passages, respectively, such that chordwise temperature gradients and vane weight are minimized.

References Cited

"A Review of Blade-Cooling Systems," Part 2—Designs Considerations, by R. J. Hodge and J. H. Johnston. The Oil Engine and Gas Turbine, February 1958, pp. 396, 397 and 398.

SAMUEL FEINBERG, Primary Examiner

U.S. Cl. X.R.

416—97